(12) United States Patent
Da Costa et al.

(10) Patent No.: US 6,372,125 B1
(45) Date of Patent: Apr. 16, 2002

(54) CATALYST COMPRISING A GROUP VIB METAL CARBIDE, PHOSPHOROUS AND ITS USE FOR HYDRODESULPHURISATION AND HYDROGENATION OF GAS OILS

(75) Inventors: Patrick Da Costa, Versailles; Jean-Marie Manoli, Saint-Maur-des-Fosses; Claude Potvin, Paris; Gérald Dejega-Mariadassou, Igny; Pedro Da Silva, Rueil-Malmaison; Slavik Kasztelan, Rueil-Malmaison; Fabrice Diehl, Rueil-Malmaison; Michéle Breysse, Caluire, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/643,863

(22) Filed: Aug. 23, 2000

Related U.S. Application Data
(60) Provisional application No. 60/158,123, filed on Oct. 8, 1999.

(30) Foreign Application Priority Data

Aug. 23, 1999 (FR) ............................................. 99 10713

(51) Int. Cl.$^7$ .......................... C10G 45/04; B01J 27/22; B01J 21/18; D01F 9/12; C01B 31/30
(52) U.S. Cl. ................... 208/216 R; 208/213; 208/217; 502/177; 502/185; 502/208; 502/210; 502/211; 502/213; 502/423; 502/447.5; 502/439
(58) Field of Search ................................ 502/177, 185, 502/208, 210, 211, 213; 423/439, 447.5; 501/87, 93; 208/216 R, 213, 217

(56) References Cited

U.S. PATENT DOCUMENTS

| | | | | |
|---|---|---|---|---|
| 4,216,034 A | * | 8/1980 | Miyake et al. | 148/20.3 |
| 4,257,809 A | * | 3/1981 | Burden | 75/203 |
| 4,265,662 A | * | 5/1981 | Miyake et al. | 75/238 |
| 4,271,041 A | * | 6/1981 | Boudart et al. | 502/177 |
| 4,325,843 A | * | 4/1982 | Slaugh et al. | 252/443 |
| 4,326,992 A | * | 4/1982 | Slaugh et al. | 252/443 |
| 4,851,206 A | * | 7/1989 | Boudart et al. | 423/409 |
| 5,196,389 A | | 3/1993 | Dubots et al. | 502/178 |
| 5,200,060 A | | 4/1993 | Sajkowski et al. | 208/108 |
| 5,288,676 A | * | 2/1994 | Shimada et al. | 501/93 |
| 5,308,597 A | * | 5/1994 | Ledoux et al. | 502/177 |
| 5,338,716 A | * | 8/1994 | Triplett et al. | 502/64 |
| 5,451,389 A | * | 9/1995 | Sherif | 502/177 |
| 5,451,557 A | * | 9/1995 | Sherif | 502/177 |
| 5,573,991 A | * | 11/1996 | Sherif et al. | 502/177 |
| 5,679,825 A | | 10/1997 | Ooms et al. | 558/274 |
| 6,162,350 A | * | 12/2000 | Soled et al. | 208/113 |
| 6,207,609 B1 | * | 3/2001 | Gao et al. | 502/177 |

FOREIGN PATENT DOCUMENTS

EP 0 511 919 11/1992

* cited by examiner

Primary Examiner—Mark L. Bell
Assistant Examiner—Patricia L. Hailey
(74) Attorney, Agent, or Firm—Millen, White, Zelano & Branigan, P.C.

(57) ABSTRACT

The invention concerns a catalyst containing at least one amorphous oxide matrix, at least one carbide and phosphorous deposited on said catalyst or contained in the matrix, in which the carbide contain at least one group VIB element and, optionally, at least one element from group VIII of the periodic table. The invention also concerns the use of the catalyst for hydrodesulphurisation and hydrogenation of aromatic compounds in gas oils with a low sulphur content.

22 Claims, No Drawings

CATALYST COMPRISING A GROUP VIB METAL CARBIDE, PHOSPHOROUS AND ITS USE FOR HYDRODESULPHURISATION AND HYDROGENATION OF GAS OILS

This application claims the benefit of the filing date of U.S. Provisional Application Ser. No. 60/158,123 filed Oct. 8, 1999.

The present invention relates to a catalyst containing a carbide of at least one group VIB metal and phosphorous on an amorphous support, and to the use of this catalyst for hydrotreatment of hydrocarbon-containing, feeds with low sulphur contents.

The present invention also relates to the field of fuel for internal combustion engines, more particularly the manufacture of a fuel for a compression ignition engine from a novel hydrotreatment catalyst phase.

Gas oil cuts, whether from distillation or from a conversion process such as catalytic cracking, currently contain non negligible quantities of aromatic, nitrogen-containing, and sulphur-containing compounds. The current legislation of the majority of industrialised countries requires that fuel which can be used in engines must contain less than 500 parts per million by weight (ppm) of sulphur. In the very near future, this maximum quantity will be reduced to 350 ppm in about 2000 and to 50 ppnm in about 2005 for the member states of the European Community. Regarding the amount of polyaromatic compounds in gas oils, this may be reduced to a very low value (of the order of 1% to 2%) from 2005. In this context, hydrogenation of the polyaromatics contained in gas oil cuts is thus increasing in importance, because of the new sulphur and aromatic compound limits in this type of fuel.

Desulphurisation is generally carried out under conditions and using catalysts which are not capable of simultaneously carrying out hydrogenation of the aromatic compounds. Thus a first treatment of the cut must be carried out to reduce the sulphur content followed by a second treatment to hydrogenate the aromatic compounds contained in the cut. This second step is generally carried out by bringing the cut, in the presence of hydrogen, into contact with a catalyst generally based on a noble metal. However, because the desulphurisation process can never completely eliminate the sulphur-containing and nitrogen-containing compounds, the catalysts used must be able to operate in the presence of such compounds, which are powerful inhibitors of the activity of noble metals. It is thus important to seek out active phases having good thio-resistant properties. The aim of the present invention is thus to discover a novel catalyst based on a carbide which could be substituted for the noble metals used by the skilled person.

The use of massive or supported group VIB carbides as hydrotreatment catalysts for certain reactions on a model or actual feed has already formed the subject matter of prior art publications (S. T. Oyama et al., in Catal. Today, 15 (1992) pp. 179–200, or App. Catal., 168 (1998), pp. 219–228 and App. Catal. A., 134 (1996), pp. 339–349).

The Applicant has discovered that surprisingly, the introduction of a quantity of phosphorous can substantially improve the activity of a catalyst containing at least one carbonized group VIB metal on an amorphous oxide support, preferably alumina or silica-alumina. Further, the activity of the catalyst is better if during preparation of the catalyst, a heteropolyanion type compound containing at least one group VIB element, phosphorous and group VIB elements introduced by any precursor is preferentially used. The catalyst can optionally contain at least one element from group VIII of the periodic table. Such a catalyst can advantageously carry out hydrodesulphurisation and hydrogenation of aromatic compounds in hydrocarbon-containing feeds containing sulphur-containing compounds.

The invention also concerns the use of said catalyst for treating hydrocarbon-containing cuts containing sulphur and aromatic compounds and more particularly gas oil cuts from distilling crude oil and a variety of conversion processes such as cuts known as "cycle oils" from catalytic cracking processes. The catalyst of the present invention can be used for desulphurisation and hydrogenation of hydrocarbon-containing cuts. The feed which can be treated using the process of the invention has sulphur contents of less than 2000 ppm by weight, preferably 0.01 to 500 ppm by weight. However, this catalyst can also be suitable for any process aimed at hydrogenating all or a portion of the aromatic compounds of a feed containing traces of sulphur-containing compounds, such as hydrogenation of aromatic compounds in edible oils and in solvents.

The catalyst of the present invention generally comprises, in weight % with respect to the total catalyst weight:

0.1% to 30% of a carbide phase containing at least one group VIB element with formula $M_xC_y$ where M is at least one group VIB element and the ratio $y/x$ is in the range 0.75 to 0.25;

01% to 10% of phosphorous; and optionally:

0 to 10% of at least one metal from group VIII of the periodic table.

Thus the catalyst comprises phosphorous and a group VIB metal, such that the preferred P/VIB metal mole ratio is in the range 0.05 to 1.2, more preferably in the range 0.08 to 0.55.

The catalyst is characterized in that the carbide phase is in the form of small particles with a size of less than 80 Å, preferably less than 50 Å and more preferably less than 30 Å.

The catalyst of the present invention can be prepared using any method which is well known to the skilled person. Preferably, the catalyst of the present invention can be obtained using the following steps:

a) impregnating a solution into an amorphous oxide matrix, said solution containing at least one group VIB element, phosphorous and optionally a group VIII element. Preferably, a salt of a heteropolyanion containing at least one group VIB element and phosphorous and optionally at least one group VIII element more generally with formula $A_xB_yC_zO_n$ is used, where A is at least one group VIB element, B is a group VIII element, C is phosphorous and O is oxygen, where the ratios $z(x+y)$ can be in the range 0.05 to 1.2, preferably in the range 0.08 to 0.55, b) optionally, drying;

c) optionally, activating the catalyst in an oxidising or neutral mixture, d) optionally, carrying out a reduction step;

e) carbonization with a hydrocarbon;

f) optionally, passivating in an inert gas plus oxygen.

Impregnation step a) can be carried out using any method which is well known to the skilled person. The components constituting the catalyst can be introduced separately into the catalyst, in successive addition steps using solutions of one or more elements, or simultaneously using a common solution of the elements. When a plurality of impregnation steps are carried out to produce the catalyst, drying or activation (calcining or reduction) steps can be carried out between two successive impregnation steps.

Drying step b) can be carried out using any method which is well known to the skilled person, at a maximum temperature of 150° C.

Activation step c) consists of calcining in a neutral or oxidising mixture using any method which is well known to the skilled person at a temperature of more than 100° C. and less than 900° C.

Reduction step d) consists of reduction in pure hydrogen or hydrogen mixed with an inert gas (for example argon) at a temperature of more than 100° C. and less than 900° C.

Carbonization step e) is carried out in two parts. A first part consists of placing the catalyst in an inert atmosphere (for example under argon) up to temperatures of 400° C. or 500° C. depending on the group VI metal used. The second part (the carbonization step proper) consists of carbonizations preferably using a programmed temperature profile in a hydrocarbon/hydrogen mixture (for example a mixture of 20% methane or any alkane, alkene or alkyne used pure or as a mixture and with the complement to 100% of hydrogen) to final temperatures of 677° C. to 850° C. Depending on the metal used, a final constant temperature stage is necessary to obtain a catalyst with good catalytic properties.

Step f) is a passivation step. Since this type of catalyst can be pyrophoric, a supplemental step is then necessary to avoid total oxidation of this catalyst. This step is generally carried out at ambient temperature (25° C.) by placing the catalyst under an inert gas then adding a low partial pressure of oxygen to that gas (1%) for periods of 1 to 15 hours.

The amorphous oxide matrix is selected from transition aluminas, silicas and silica aluminas and mixtures thereof. This type of support has a specific surface area, determined using techniques which are known to the skilled person, in the range 100 to 600 $m^2/g$, preferably in the range 150 to 500 $m^2/g$. The amorphous oxide support can be used in the form of a powder or pre-formed in the form of beads or extrudates.

Sources of group VIB elements which can be used are well known to he skilled person. As an example, preferred sources of molybdenum and tungsten which are used are oxides and ammonium salts are used such as ammonium molybdate, ammonium heptamolybdate and ammonium metatungstate. Preferably, salts of heteropolyacids of group VIB metals such as phosphomolybdic acid or phosphotungstic acid are used.

The precursors of group VIII metals which can be used are well known to the skilled person. As an example, for non noble metals, nitrates, sulphates, phosphates, halides, for example chlorides, bromides and fluorides, or carboxylates, for example acetates and carbonates, are used. For the noble metals nitrates are used when they exist, halides, for example chlorides, nitrates, acids such as chloroplatinic acid, or chloroiridic acid, alkali metal chlorometallates, chloro- or hydroxo-amminated complexes, or oxychlorides such as ammoniacal ruthenium oxychloride. It is also possible to use soluble co-ordination complexes in organic solvents, such as acetylacetonate complexes. It is also possible to use carbonyl complexes.

Preferably, the group VIII metal is selected from non-noble metals and preferably from nickel and cobalt.

The hydrocarbons used for the carbonization step can be selected from alkanes, alkenes, alkynes, aromatic compounds or any other hydrocarbon-containing compound which is well known to the skilled person for its carbonizing properties. These hydrocarbons can be mixed with an inert gas or with hydrogen.

The hydrodesulphurisation process of the invention is generally carried out at temperatures of 100° C. to 400° C., preferably 150° C. to 380° C. The operating pressure is generally 0.1 to 30 MPa, preferably 1 to 20 MPa. The space velocity, expressed as the volume of liquid feed treated per volume of catalyst per hour, is generally 0.1 to 20 $h^{1-}$. The hydrogen/feed ratio used is expressed as the volume of hydrogen measured under normal conditions per volume of liquid feed; it is generally 50/1 to 2000/1.

The feeds used generally contain at least 10% of aromatic compounds and less than 2000 ppm of S. They may be kerosines or gas oils from atmospheric distillation or feeds originating from refining processes such as catalytic cracking, coking, visbreaking, and hydroconversion of residues.

The following non limiting examples illustrate the invention.

EXAMPLE 1
Preparation of an Alumina Support

We produced large quantities of an alumina-based support so as to be able to prepare the catalysts described below from the same formed support. To this end, we used a matrix composed of ultrafine tabular boehmite or alumina gel sold by Condea Chemie GmbH under the trade name SB3. This gel was mixed with an aqueous solution containing 66% nitric acid (7% by weight of acid per gram of dry gel) then mixed for 15 minutes. Following mixing, the paste obtained was passed through a die with cylindrical orifices with a diameter of 1.3 mm. The extrudates were then dried overnight at 120° C. and calcined at 550° C. for 2 hours in moist air containing 7.5% by weight of water. Cylindrical extrudates 1.2 mm in diameter were thus obtained, with a specific surface area of 243 $m^2/g$, a pore volume of 0.61 $cm^3/g$ and a unimodal pore size distribution centred on 10 nm. X ray diffraction analysis of the matrix revealed that it was solely composed of low crystallinity cubic gamma alumina.

EXAMPLE 2
Preparation of Sulphurised Mo and CoMo Catalysts (not in Accordance with the Invention)

Thirty grams of the alumina support of Example 1 were impregnated by nascent humidity, in one step, from a solution of ammonium heptamolybdate so as to deposit 13.5% by weight of $MoO_3$ on the alumina surface. After ageing, this sample was oven dried overnight at 80° C. The sample then underwent calcining in dry air at 500° C. for two hours. The catalyst was then sulphurised with a $H_2/H_2S$ mixture containing 15% by volume of $H_2S$ at 350° C. for 2 hours. Reference catalyst Mo-S was thus obtained.

A sulphurised MoP/alumina catalyst was then prepared. Thirty grams of the alumina support of Example 1 were impregnated by nascent humidity, in one step, from a solution of ammonium heptamolybdate and phosphoric acid so as to deposit 13.5% by weight of $MoO_3$ and 2.66% by weight of $P_2O_5$ on the alumina surface. After ageing, this sample was oven dried overnight at 80° C. The sample then underwent calcining in dry air at 500° C. for two hours. The catalyst was then sulphurised with a $H_2/H_2S$ mixture containing 15% by volume of $H_2S$ at 350° C. for 2 hours. Reference catalyst MoP-S was thus obtained.

A sulphurised CoMo/alumina catalyst was then prepared. Thirty grams of the alumina support of Example 1 were impregnated by nascent humidity, in one step, from a solution of ammonium heptamolybdate and cobalt nitrate so as to deposit 13.5% by weight of $MoO_3$ and 2.66% by weight of $P_2O_5$ on the alumina surface. After ageing, this sample was oven dried overnight at 80° C. The sample then underwent calcining in dry air at 500° C. for two hours. The catalyst was then sulphurised with a $H_2/H_2S$ mixture containing 15% by volume of $H_2S$ at 350° C. for 2 hours. Reference catalyst CoMo-S was thus obtained.

A sulphurised CoMoP/alumina catalyst was then prepared. Thirty grams of the alumina support of Example 1 were impregnated by nascent humidity, in one step, from a solution of ammonium heptamolybdate, cobalt nitrate and phosphoric acid so as to deposit 13.5% by weight of $MoO_4$, 4% by weight of CoO and 2.66% by weight of $P_2O_5$ on the alumina surface. After ageing, this sample was oven dried overnight at 80° C. The sample then underwent calcining in dry air at 500° C. for two hours. The catalyst was then sulphurised with a $H_2/H_2S$ mixture containing 15% by volume of $H_2S$ at 350° C. for 2 hours. Reference catalyst CoMoP-S was thus obtained.

EXAMPLE 3
Preparation of Carbonized Mo and CoMo Catalysts (not in Accordance with the Invention)

Thirty grams of the alumina support of Example 1 were impregnated by nascent humidity, in one step, from a solution of ammonium heptamolybdate so as to deposit 13.5% by weight of $MoO_3$ on the alumina surface. After ageing, this sample was oven dried overnight at 80° C. The sample was then removed for carbonizing as follows: the temperature was raised at 60° C./h to 400° C. in argon to dry and reduce the catalyst, followed by a carbonizing step at a programmed temperature profile of 30° C./h to 677° C. in a stream of methane at atmospheric pressure. The catalyst was then cooled in a stream of argon to ambient temperature then treated in a stream of argon and 1% of oxygen for 15 hours to passivate it. Reference catalyst Mo-C was thus obtained.

A carbonized CoMo/alumina catalyst was then prepared. Thirty grams of the alumina support of Example 1 were impregnated by nascent humidity, in one step, from a solution of ammonium heptamolybdate and cobalt nitrate so as to deposit 13.5% by weight of $MoO_3$ and 4% by weight of CoO on the alumina surface. After ageing, this sample was oven dried overnight at 80° C. The sample was then removed for carbonizing as follows: the temperature was raised at 60° C./h to 400° C. in argons to dry and reduce the catalyst, followed by a carbonizing step at a programmed temperature profile of 30° C./h to 677° C. in a stream of methane at atmospheric pressure. The catalyst was then cooled in a stream of argon to ambient temperature then treated in a stream of argon and 1% of oxygen for 15 hours to passivate it. Reference catalyst CoMo-C was thus obtained.

EXAMPLE 4
Preparation of Carbonized MoP/alumina and CoMoP/alumina (in Accordance with the Invention)

A catalyst was prepared in the same manner as that described for Example 3 by impregnating the alumina of Example 1 with a solution of ammonium heptamolybdate and phosphoric acid so as to deposit 13.5% by weight of $MoO_3$ and 2.66% by weight of $P_2O_5$ on the alumina surface. The non calcined sample underwent the same ageing, drying, carbonizing and passivation treatment as the sample of catalyst Mo-C of Example 3. Catalyst MoP-C was thus obtained.

Catalyst CoMoP was then prepared. In the same manner as that described for Example 3, the alumina of Example 1 was impregnated with a solution of ammonium heptamolybdate, cobalt nitrate and phosphoric acid so as to deposit 13.5% by weight of $MoO_3$, 4% by weight of CoO and 2.66% by weight of $P_2O_5$ on the alumina surface. The non calcined sample underwent the same ageing, drying, carbonizing and passivation treatment as sample of catalyst Mo-C of Example 3. Catalyst CoMoP-C1 was thus obtained. XRD analysis revealed that the catalyst contained no carbide particles with a size greater than 80 Å.

EXAMPLE 5
Preparation of a Carbonized MoP/alumina Catalyst (in Accordance with the Invention)

In the same manner as that described for Example 4, a catalyst was prepared from the alumina of Example 1 by impregnation with commercially available phosphomolybdic acid $H_3PMo_{12}O_{40}$ solution. The non calcined sample underwent the same ageing, drying, carbonizing and passivation treatment as catalyst Mo-C of Example 3. Catalyst MoP-C2 was thus obtained. XRD analysis revealed that the catalyst contained no carbide particles with a size greater than 80 Å.

EXAMPLE 6
Preparation of a Carbonized MoP/alumina Catalyst (in Accordance with the Invention)

In the same manner as that described for Example 4, a catalyst was prepared from the alumina of Example 1 by impregnation with a water-soluble heteropolyanion $(NH_4)_6P_2Mo_5O_{23}$. A portion of the sample was dried then underwent the same ageing, drying, carbonizing and passivation treatment as the sample of catalyst Mo-C of Example 3. Catalyst MoP-C3 was thus obtained. XRD analysis revealed that the catalyst contained no carbide particles with a size greater than 80 Å.

EXAMPLE 7
Preparation of a Carbonized MoP/alumina Catalyst (in Accordance with the Invention)

In the same manner as that described for Example 4, a catalyst was prepared from the alumina of Example 1 by impregnation with a water-soluble heteropolyanion $(NH_4)_6P_2Mo_{18}O_{62}$. The dried sample underwent the same ageing, drying, carbonizing and passivation treatment as the sample of catalyst Mo-C of Example 3. Catalyst MoP-C4 was thus obtained. XRD analysis revealed that the catalyst contained no carbide particles with a size greater than 80 Å.

EXAMPLE 8
Catalytic Activity for Tetrahydronaphthalene Hydrogenation

The catalysts of Examples 2 to 7 were tested for tetrahydronaphthalene hydrogenation at a total pressure of 40 bars and for a contact time of 0.4 seconds with 0.2 g of catalyst at 300° C. The test feed comprised tetrahydronaphthalene in n-heptane ($nC_7$). The partial pressures were as follows: $P_{H2}$=30.6 bars, $P_{nC7}$=9.3 bars, $P_{reactant}$=0.1 bars. The catalytic activity, expressed as the moles of reactant transformed for identical catalyst quantities was measured after conversion stabilisation.

The results of Table 1 show that the molybdenum carbides supported on alumina containing phosphorous synthesised in Examples 2 to 6 were more hydrogenating than the reference catalyst which contained no phosphorous. Further, the carbides containing phosphorous prepared from heteropolyanions were more active than the MoP-C1 sample prepared from ammonium heptamolybdate and phosphoric acid.

TABLE 1

| Ref. Catalyst | P/Mo | Catalytic activity (mol/g catalyst/h) |
|---|---|---|
| Mo-C | 0 | 6 |
| Mo-S | 0 | 5 |
| MoP-C1 | 0.4 | 10 |
| MoP-C2 | 0.08 | 9 |
| MoP-C3 | 0.4 | 13 |
| MoP-C4 | 0.11 | 12 |

The catalysts of Examples 2 to 7 were then tested using a procedure identical to that described above except that dimethyldisulphide (DMDS) was added to the test feed so as to obtain a sulphur content of 200 ppm S by weight.

The catalytic activity, expressed in moles of reactant, namely tetrahydronaphthalene, transformed for identical catalyst quantities, was measured after conversion stabilisation.

The results of Table 2 show that the carbides containing phosphorous retained an activity which was higher than that of the reference catalyst containing no phosphorous when the feed contained sulphur.

TABLE 2

| Ref. Catalyst | P/Mo | Catalytic activity (mol/g catalyst/h) |
|---|---|---|
| Mo-C | 0 | 3 |
| Mo-S | 0 | 4 |
| MoP-C1 | 0.4 | 5 |
| MoP-C3 | 0.4 | 7.5 |
| MoP-C4 | 0.11 | 7 |

EXAMPLE 9
Activity for Hydrodesulphurisation and Hydrogenation of a Gas Oil

The catalysts from Examples 2 to 7 were tested for hydrodesulphurisation of a gas oil which had previously been hydrotreated containing 520 ppm S (feed GO-A) and 135 ppm S (feed GO-B) at a total pressure of 30 bars and at an hourly space velocity of 2.6 $h^{-1}$ with 40 $cm^3$ of catalyst at 340° C.

The catalytic activity was expressed as the fraction of sulphur-containing compounds converted (%HDS) for identical catalyst quantities and after conversion stabilisation.

The results of Table 3 show that for these hydrotreated gas oils containing small quantities of sulphur, the carbonized Mo/alumina catalysts containing P were better than the catalyst containing no P.

A comparison of the carbonized catalyst containing cobalt with the reference sulphurised CoMo/alumina catalyst shows that it is also better.

TABLE 3

| Ref. Catalyst | P/Mo | GO-A 520 ppm S HDS conversion (%) at 340° C. | GO-B 135 ppm S HDS conversion (%) at 340° C. |
|---|---|---|---|
| Mo-C | 0 | 18 | — |
| Mo-S | 0 | 12 | — |
| MoP-C1 | 0.4 | 20 | 21 |
| MoP-C3 | 0.4 | 20 | 23 |
| MoP-C4 | 0.11 | 22 | 43 |
| CoMoP-C4 | 0.4 | 81 | 67 |
| CoMoP-C | 0.4 | 70 | 56 |
| CoMoP-S | 0.4 | 65 | 53 |

The amount of 4,6-dimethyldibenzothiophene (4,6-DMDBT) and the amount of saturated hydrocarbons in the gas oil and effluents at 340° C. for hydrodesulphurisation of a hydrotreated gas oil with 135 ppm S are shown in Table 4.

TABLE 4

| | P/Mo | 4,6-DMDBT content (ppm) | Saturated hydrocarbon content mol % |
|---|---|---|---|
| GO-B 135 ppm S | — | 25 | 72.5 |
| MoP-C3 | 0.4 | 15 | 73.8 |

TABLE 4-continued

| | P/Mo | 4,6-DMDBT content (ppm) | Saturated hydrocarbon content mol % |
|---|---|---|---|
| MoP-C4 | 0.11 | 18 | 73.5 |
| Mo-S | 0 | 20 | 73.0 |
| CoMoP-C4 | 0.11 | 17 | 74.8 |
| CoMoP-S | 0.4 | 21 | 73.8 |

The results shown in Table 4 illustrate the fact that catalysts based on carbide convert the refractory compound 4,6-DMDBT (4,6-dimethyldibenzothiophene) better than the sulphide catalyst CoMoP-S. Further, the increase in the saturated hydrocarbon content with the MoP-C3 and CoMoP-C4 carbides also illustrates the improved hydrogenating power of these catalysts containing group VIB carbide and phosphorous in accordance with the invention.

In conclusion, the catalysts of the invention have better selectivity with respect to the prior art catalysts.

EXAMPLE 10
Analysis of New and Used Catalysts

This example deals with characterisations obtained before and after the gas oil test with 520 ppm S by elemental analysis (analysis of total carbon and sulphur), the results of which are shown in Table 5. After the tests, the catalysts were washed with toluene under reflux (180° C.) prior to analysis then dried overnight at 150° C. in the absence of air. The aim of this operation was to eliminate from the catalyst all hydrocarbon molecules originating from the feed which could remain absorbed on the support, their presence possibly falsifying the carbon and sulphur analysis after the test.

TABLE 5

| Ref. Catalyst | P/Mo | C content before test (weight %) | C content after test (weight %) | S content after test (weight %) |
|---|---|---|---|---|
| Mo-C | 0 | 0.38 | 0.43 | 0.85 |
| Mo-S | 0 | 0 | 2.1 | 6.2 |
| MoP-S | 0.4 | 0 | 2.4 | 5.7 |
| MoP-C1 | 0.4 | 0.44 | 0.46 | 0.7 |
| MoP-C3 | 0.4 | 0.44 | 0.49 | 0.8 |
| MoP-C4 | 0.11 | 0.43 | 0.47 | 0.6 |

These results enable the conclusion to be drawn that the carbides of Examples 3 and 7 do not lose their carbide phase and are not transformed into the sulphide during the tests, since their sulphur content after the test remained far lower than that of the sulphide catalysts Mo-S and MoP-S. This result was also confirmed by the absence of $MoS_2$ lamellae on the support surface in the transmission electron microscope exposures.

What is claimed is:

1. A catalyst comprising at least one amorphous support, at least one carbonized metal from Group VIB of the periodic table and phosphorous.

2. A catalyst according to claim 1, further comprising at least one metal from group VIII of the periodic table.

3. A catalyst according to any one of claim 2 in which the group VIII metal is selected from cobalt and nickel.

4. In a catalytic hydrodesulphurisation process comprising contacting a feed with a catalyst at temperatures of 100° C. to 400° C., at an operating pressure of 0.1 to 30 MPa, at a space velocity, expressed as the volume of liquid feed treated per volume of catalyst per hour, in the range 0.1 to 20 $h^-$, with a hydrogen feed ratio, expressed as the volume of hydrogen, in the range 50/1 to 2000/1 the improvement wherein the catalyst is according to claim 2.

5. A catalyst according to claim 1 comprising, in weight % with respect to the total catalyst mass:
- 10% to 90% of at least one amorphous support;
- 0.1% to 30% of a carbide phase containing at least one group VIB element with formula MxCy where M is at least one group VIB element and the ratio y/x is in the range 0.75 to 0.25;
- 0.1% to 10% of phosphorous;
- 0 to 10% of at least one metal from group VIII of the periodic table.

6. A catalyst according to claim 5, in which the amorphous oxide support is selected from transition aluminas, silicas, silica-aluminas.

7. A catalyst according to claim 6 in which the support has a specific surface area in the range 100 to 600 m²/g.

8. In a catalytic hydrodesulphurisation process comprising contacting a feed with a catalyst at temperatures of 100° C. to 400° C., at an operating pressure of 0.1 to 30 MPa, at a space velocity, expressed as the volume of liquid feed treated per volume of catalyst per hour, in the range 0.1 to 20 h$^{-1}$, with a hydrogen feed ratio, expressed as the volume of hydrogen, in the range 50/1 to 2000/1 the improvement wherein the catalyst is according to claim 7.

9. A catalyst according to claim 7, in which the group VIB metal is selected from molybdenum and tungsten.

10. In a catalytic hydrodesulphurisation process comprising contacting a feed with a catalyst at temperatures of 100° C. to 400° C., at an operating pressure of 0.1 to 30 MPa, at a space velocity, expressed as the volume of liquid feed treated per volume of catalyst per hour, in the range 0.1 to 20 h$^{-1}$, with a hydrogen feed ratio, expressed as the volume of hydrogen, in the range 50/1 to 2000/1 the improvement wherein the catalyst is according to claim 6.

11. In a catalytic hydrodesulphurisation process comprising contacting a feed with a catalyst at temperatures of 100° C. to 400° C., at an operating pressure of 0.1 to 30 MPa, at a space velocity, expressed as the volume of liquid feed treated per volume of catalyst per hour, in the range 0.1 to 20 h$^{-1}$, with a hydrogen feed ratio, expressed as the volume of hydrogen, in the range 50/1 to 2000/1 the improvement wherein the catalyst is according to claim 5.

12. A catalyst according to claim 1, in which the group VIB metal carbide is in the form of particles with a size of less than 80 Å.

13. In a catalytic hydrodesulphurisation process comprising contacting a feed with a catalyst at temperatures of 100° C. to 400° C., at an operating pressure of 0.1 to 30 MPa, at a space velocity, expressed as the volume of liquid feed treated per volume of catalyst per hour, in the range 0.1 to 20 h$^{-1}$, with a hydrogen feed ratio, expressed as the volume of hydrogen, in the range 50/1 to 2000/1 the improvement wherein the catalyst is according to claim 12.

14. A catalyst according to claim 12, in which the group VIB metal is selected from molybdenum and tungsten.

15. A catalyst according to claim 1 in which the group VIB metal is selected from molybdenum and tungsten.

16. In a catalytic hydrodesulphurisation process comprising contacting a feed with a catalyst at temperatures of 100° C. to 400° C., at an operating pressure of 0.1 to 30 MPa, at a space velocity, expressed as the volume of liquid feed treated per volume of catalyst per hour, in the range 0.1 to 20 h$^{-1}$, with a hydrogen feed ratio, expressed as the volume of hydrogen, in the range 50/1 to 2000/1 the improvement wherein the catalyst is according to claim 15.

17. Preparation of a catalyst according to claim 1, comprising:
- a) impregnating a solution into an amorphous oxide matrix, said solution containing at least one group VIB element, phosphorous and optionally a group VIII element;
- b) optionally, drying;
- c) optionally, activating the catalyst in an oxidising or neutral mixture;
- d) optionally, carrying out a reduction step;
- e) carbonization with a hydrocarbon;
- f) optionally, passivating in an inert gas plus oxygen.

18. Preparation according to claim 17, in which the sources of the group VIB metal are selected from the group formed by oxides, ammonium salts, and salts of heteropolyacids.

19. Preparation according to claim 17, in which the group VIB metal is introduced by a salt of a heteropolyanion containing at least one group VIB element, phosphorous and optionally at least one group VIII element with formula AxByCzOn where A is at least one group VIB element, B is a group VIII element with $0 \leq y$, C is phosphorous and O is oxygen, where the ratio z/(x+y) is between 0.05 and 1.2.

20. Preparation according to claim 17, in which the hydrocarbons used for the carbonization step are selected from the group formed by alkanes, alkenes, alkynes and aromatic compounds.

21. In a catalytic hydrodesulphurisation process comprising contacting a feed with a catalyst at temperatures of 100° C. to 400° C., at an operating pressure of 0.1 to 30 MPa, at a space velocity, expressed as the volume of liquid feed treated per volume of catalyst per hour, in the range 0.1 to 20 h$^{-1}$, with a hydrogen feed ratio, expressed as the volume of hydrogen, in the range 50/1 to 2000/1 the improvement wherein the catalyst is according to claim 1.

22. A process according to claim 21, in which the feeds contains at least 10% of aromatic compounds and less than 2000 ppm of S, and is selected from the group consisting of kerosines, gas oils from atmospheric distillation, feeds resulting from catalytic cracking, coking, visbreaking, and residue hydroconversion processes.

* * * * *

UNITED STATES PATENT AND TRADEMARK OFFICE
CERTIFICATE OF CORRECTION

PATENT NO. : 6,372,125 B1
DATED : April 16, 2002
INVENTOR(S) : Da Costa et al.

It is certified that error appears in the above-identified patent and that said Letters Patent is hereby corrected as shown below:

<u>Title page,</u>
Item [75], Inventors "Michéle" should be -- Michèle --.

<u>Column 8,</u>
Line 58, delete "any one of".
Line 65, "h⁻" should be -- $h^{-1}$ --.

Signed and Sealed this

Fifth Day of April, 2005

JON W. DUDAS
*Director of the United States Patent and Trademark Office*